United States Patent [19]

Kempf

[11] 4,407,434
[45] Oct. 4, 1983

[54] APPARATUS HAVING AN IMPROVED FLOW CONTROL PINCH VALVE FOR DISPENSING FLOWABLE MATERIALS

[75] Inventor: Dennis D. Kempf, San Jose, Calif.
[73] Assignee: FMC Corporation, Philadelphia, Pa.
[21] Appl. No.: 259,720
[22] Filed: May 1, 1981
[51] Int. Cl.³ .............................................. B65D 37/00
[52] U.S. Cl. .................................. 222/214; 222/207; 222/215; 222/439; 222/452; 251/7
[58] Field of Search ............... 222/206, 207, 212, 214, 222/434, 438, 439, 440, 444, 445, 447, 448, 449, 450, 528, 452; 251/4, 7, 9

[56] References Cited
U.S. PATENT DOCUMENTS 1,876,988  9/1932  Lormor ................................ 222/207
1,939,939 12/1933  Worrell ........................... 222/447 X
2,673,011  3/1954  Rood et al. ..................... 222/214 X

FOREIGN PATENT DOCUMENTS 20622 of 1893 United Kingdom ................ 222/450

Primary Examiner—Joseph J. Rolla
Assistant Examiner—Kevin P. Shaver
Attorney, Agent, or Firm—Eugene G. Horsky; H. Robinson Ertelt

[57] ABSTRACT

An improved apparatus for dispensing flowable material having a pinch valve, an operating lever, a support plate, and a resilient tube located between the lever and the support plate. Movement of an end portion of the lever operates the pinch valve which serves to sequentially isolate a measured quantity of flowable material delivered from a supply and release such measured quantity of material for discharge from the apparatus.

14 Claims, 5 Drawing Figures

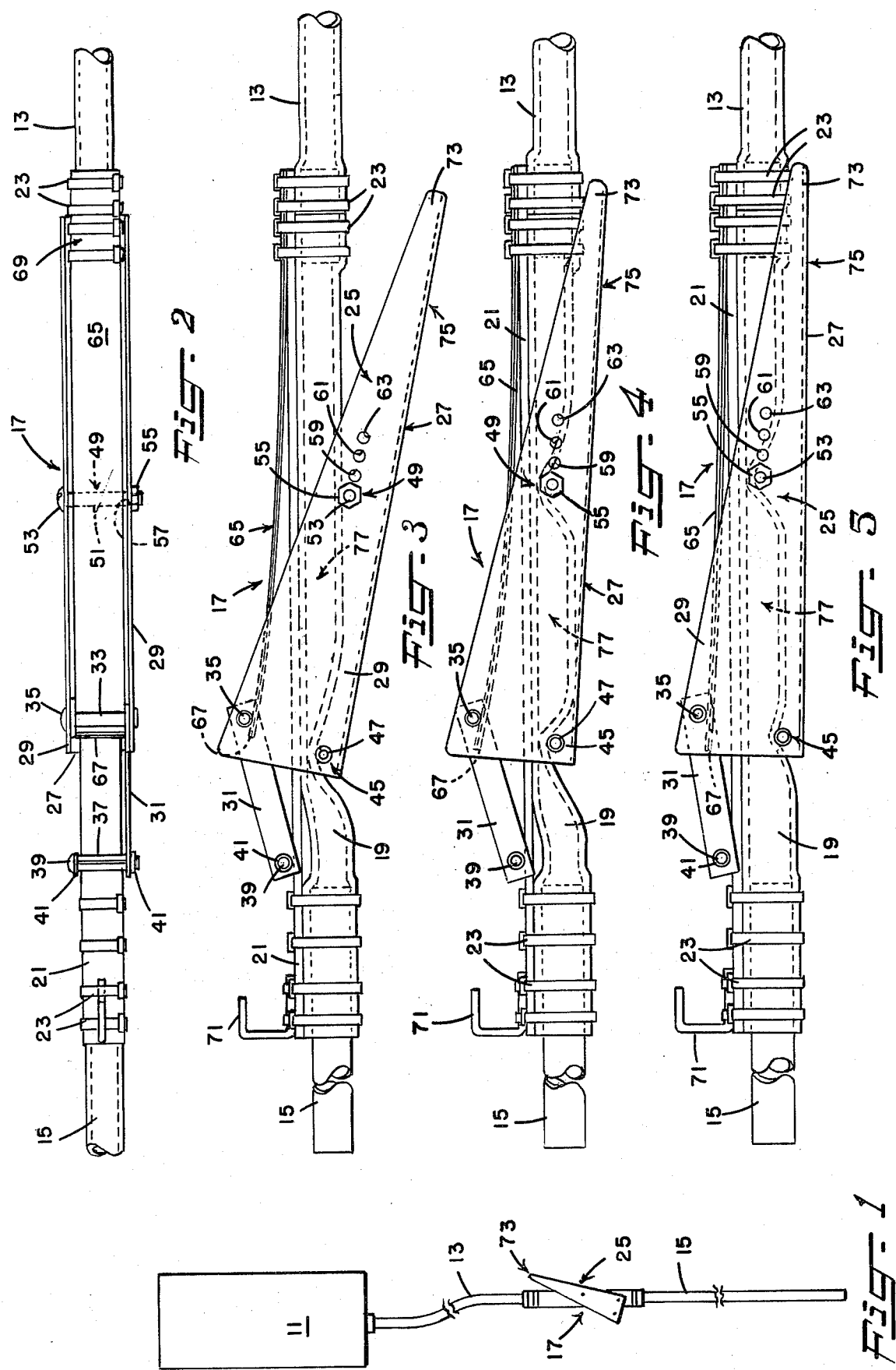

APPARATUS HAVING AN IMPROVED FLOW CONTROL PINCH VALVE FOR DISPENSING FLOWABLE MATERIALS

The present invention is directed to an improved apparatus for dispensing flowable materials, and particularly to a pinch valve which enables such apparatus to dispense measured amounts of flowable material.

The dispensing apparatus and the pinch valve of the present invention are adapted for use in a variety of applications with diverse flowable materials. As the merits of the present invention are best illustrated by the use thereof under adverse conditions or circumstances, the apparatus is hereafter described in detail in a use for which it is eminently suited; namely, in dispensing dry, particulate flowable materials, such as, fertilizers, insecticides, and the like, by unskilled operators around plants growing on remote plantations not having ready access to repair equipment and mechanics. Thus, a primary object of this invention is to provide an improved and more satisfactory apparatus for dispensing measured amounts of flowable materials.

Another object of this invention is the provision of an improved apparatus for dispensing flowable materials which is light in weight, requires a minimum of physical effort, and is durable so as to be adapted for repetitive manual operation during long periods of time.

Still another object of this invention is the provision of a pinch valve for use in apparatus for dispensing of flowable materials which is simple in construction, assembly, adjustment, and operation, yet facilitates the delivery of generally like charges of flowable materials.

These and other objects are achieved in accordance with the present invention by an improved apparatus for dispensing flowable material having a canister for containing such flowable material, a semi-flexible conduit for delivering such flowable material to a hollow wand for directed discharge, and an improved pinch valve which is adapted to isolate a measured quantity of such flowable material as it is delivered by the semi-flexible conduit and subsequently release the same for flow into the hollow wand.

The pinch valve of the present invention includes a resilient metering tube and a support plate, which extend between and are connected to adjacent ends of the semi-flexible conduit and hollow wand, and an operating lever having first and second pinch means located adjacent to the hollow wand and the supply conduit, respectively. In cooperation with the support plate, these pinch means serve to selectively collapse longitudinally spaced portions of the resilient metering tube, and to achieve this cooperation, the operating lever is connected at one end thereof for pivotal movement relative to the support plate between a position in which the resilient tube is normally collapsed by the first pinch means, and a position in which such resilient tube is permitted to relax from such normally collapsed condition only after it is collapsed by the second pinch means.

As employed herein, the terms "collapse", "collapsed", and "collapsed condition" indicate that the resilient metering tube is pinched or closed to such degree as to obstruct essentially all passage of flowable material therethrough. Thus, in its normally collapsed condition, as achieved by the first pinch means, flowable material is contained within the resilient tube, and upon relaxation of such resilient tube from its collapsed condition, a measured quantity or charge of flowable material, as previously isolated upon collapse of such tube by the second pinch means, is released for discharge from the pinch valve and into the hollow wand.

More specifically, the operating lever is connected to the support plate by means which include a pivot member, a drag link which is connected to the pivot member and the support plate and serves to longitudinally restrain the operating lever, and a spring, more specifically a curved leaf spring having one end thereof fixed to the support plate and a free end engaged against the pivot member. The first pinch means is spaced from the pivot member such distance that this pinch means normally maintains the resilient metering tube collapsed under the force applied thereto by the leaf spring.

On the other hand, the second pinch means is spaced from the pivot means and the free end of the operating lever such distances that the force applied thereto progressively increases as the free end of the lever is moved toward the support plate, with the force applied to the first pinch means by the leaf spring being concomitantly reduced. At the stage at which the forces applied to the first and second pinch means are essentially equal, the resilient metering tube remains collapsed by the first pinch means and is also collapsed by the second pinch means to thereby contain between such longitudinally spaced pinch means a measured quantity or charge of flowable material.

During the movement of the operating lever thus far described, this lever pivots about an axis passing through the first pinch means and, upon still further movement of such lever, pivotting thereof occurs about an axis passing through the second pinch means, resulting in the first pinch means being moved in a direction away from the support plate. Thus, the portion of the resilient metering tube which is normally maintained in a collapsed condition by the first pinch means now relaxes and allows release of the previously contained measured quantity or charge of flowable material.

FIG. 1 is a diagrammatic, shortened side view of an improved dispensing apparatus which includes the pinch valve of the present invention;

FIG. 2 illustrates, on an enlarged scale, the pinch valve of the present invention as viewed from the left side of FIG. 1; and FIGS. 3, 4, and 5 are side views of the pinch valve shown in FIG. 2 during various stages of valve operation.

Referring to FIG. 1, the improved dispensing apparatus includes a canister 11, within which is contained, for example, a dry, particulate insecticide, a semi-flexible conduit 13, a hollow wand 15, and the improved pinch valve 17 of the present invention. The canister 11 is attached to the back of an operator by suitable straps, not shown, as in the form of a back pack, whereupon the particulate insecticide flows by gravity through the semi-flexible conduit 13 and, when permitted by the pinch valve 17, into and through the hollow wand 15. With one hand the operator manipulates the pinch valve 17 and maneuvers the wand 15 to direct the discharging insecticide to appropriate areas about a growing plant.

As shown in FIGS. 2-5, the pinch valve 17 of the present invention includes a resilient metering tube 19 and a support plate 21, both of which are attached to the adjacent ends of the conduit 13 and wand 15 by cable ties 23. Cooperating with the metering tube 19 and the support plate 21 is an operating lever 25 having a web 27 and flanges 29 which straddle the support plate 21. A drag link 31 is attached at one end to the operating lever 25 by a tubular spacer 33, and a rivet 35 which serves as a pivot member, and is pivotally mounted at its opposite end to a tubular spacer 37, welded or otherwise fixed to the support plate 21, by a rivet 39 and flat washers 41.

The operating lever 25 also includes a first pinch means 45 which may have a rivet 47 extending between and through the lever flanges 29, and a second pinch means 49, which may consist of a tubular spacer 51, bolt 53, and lock nut 55. As shown in FIGS. 2-5 the lever flanges 29 are provided with aligned openings 57, 59, 61, and 63 for reception of the bolt 53, for purposes as hereafter described. Completing the pinch valve construction is a curved leaf spring 65 having a free end 67 engaged with the tubular spacer 33 and its opposite end welded in the area 69 to the support plate 21. A wire hook 71 is fixed to the support plate 21 to facilitate attachment of pinch valve 17, and depending wand 15 to the canister 11 when not in use.

Normally, force applied to the pivot member 35 by the curved leaf spring 65 is primarily reacted by the pinch means 45, causing the rivet 47 to collapse the resilient tube 19 in a manner as shown in FIG. 3. Thus, the particulate insecticide, flowing by gravity from the canister 11, through the semi-flexible conduit 13, and into the resilient metering tube 19, is obstructed at the collapsed portion of such resilient tube 19.

As the free end portion 73 of the operating lever 25 is moved toward and into a position shown in FIG. 4, as indicated by the arrow 75, the force applied by the second pinch means 49 causes the tubular spacer 51 to collapse the resilient tube 19. During this movement, the lever 25 pivots about the rivet 35, and the presence of the drag link 31 restrains the lever 25 from longitudinal motion, but causes the first pinch means 45 to move slightly to the right, as viewed in FIGS. 3 and 4. Thus, the force applied by the first pinch means 45 is reduced, yet is sufficient to maintain the resilient tube 19 collapsed by the first pinch means 45.

At the stage shown in FIG. 4, a measured quantity or charge 77 of insecticide is trapped inbetween the portions of the resilient tube 19 collapsed by the first and second pinch means 45 and 49. Upon still further movement of the lever end portion 73 into its position shown in FIG. 5, the force applied by the second pinch means 49 during this movement increases while the force applied by the first pinch means 45 decreases below that required to maintain the resilient tube 19 fully collapsed. Thus, the portion of the resilient tube 19, once collapsed by the first pinch means 45, is now permitted to relax from such collapsed condition as the lever 25 now pivots about the spacer 51 and the first pinch means 45 is moved away from the support plate 21. The charge 77 of insecticide is now free to flow and does flow by gravity into the hollow wand 15 for discharge onto areas selected by the operator's movement of such wand.

The metered quantity or charge 77 of insecticide may be increased by simply relocating the tubular spacer 51 and bolt 53 in alignment with the openings 59, 61 or 63 in the lever flanges 29. It will be apparent that the charge 77 will be greatest when the tubular spacer 51 and bolt 53 are aligned with the openings 63 in the lever flanges 29. It will also be apparent that in this extreme position of the tubular spacer 51 and bolt 53, as compared to the positions thereof illustrated in the drawing, collapse of the resilient metering tube 19 by the second pinch means 49 will be delayed slightly. Thus, it is necessary that the curved leaf spring 65 be of such strength that the force applied by the first pinch means 45 maintain the resilient tube 19 collapsed until it is also collapsed by the second pinch means 49 when the tubular spacer 51 and bolt 53 are placed in the extreme position; that is, aligned with the lever flange openings 63. In satisfying this condition, it is possible that, when the tubular spacer 51 and bolt 53 are in positions illustrated in the drawing and the resilient tube 19 is in its normally collapsed condition shown in FIG. 3, the strength of the curved leaf spring 65 employed may also cause a partial closing of the resilient tube 19 by the second pinch means 49. In the absence of a collapse of the resilient tube 19 by the second pinch means 49, the partial closing thereof is, of course, of no concern.

From the above description, it is apparent that the improved dispensing apparatus, and particularly the pinch valve of this invention, is simple in construction and can therefore be economically produced, readily assembled, adjusted, and used by unskilled operators and, if necessary, repaired on site without need of complex tools and/or machinery. Moreover, as the pinch valve employs a minimum of moving elements, none of which are subjected to large or excessive stresses, it is extremely durable, notwithstanding its intended repetitive use.

While the dimensions, strengths, and materials employed in the construction of the different elements of the pinch valve described may be varied, satisfactory results have been achieved using a soft rubber metering tube 19 having an inside diameter of about $\frac{1}{2}$" and a wall thickness of $\frac{1}{8}$", a flat metal bar approximately $\frac{3}{4}$" wide and 3/16" thick as a support plate 21 and a leaf spring 65 formed of two plies of spring steel 0.054" thick, $\frac{3}{4}$" wide, curved to a 9.5" radius, and of such length as to have an active length of about $7\frac{1}{4}$". With the elements of the pinch valve assembled as shown in FIG. 3, the free end 67 of the leaf spring 65 exerted a force of about 7.3 lbs. on the pivot member, as defined by the tubular spacer 33 and rivet 35. With spacings (moment arms) of the first and second pinch means 45 and 49 of 0.62" and 2.84", respectively, from the pivot member, reaction forces of about 6 lbs. and 1.31 lbs. were exerted at the first and second pinch means 45 and 49, respectively. The 6 lbs. force exerted by the first pinch means 45 provided the desired collapse of the rubber metering tube 19 at this location. The 1.31 lbs. force exerted by the second pinch means 49 and a moment arm of 2.84", the resulting moment was not sufficient to collapse this tube 19.

Upon applying a force of only 2.6 lbs. to the operating end portion lever 73, at 6.34" away from the pivot member, the second pinch means 49 collapsed the rubber metering tube 19, while such tube 19 was still maintained collapsed by the first pinch means 45, whereby a charge 77 of about 8.25 ml of insecticide was contained between the collapsed areas of the metering tube. At this stage, the first and second pinch means 45 and 49 were subjected to forces of about 3.5 lbs. and 6.0 lbs., respectively. In view of the movement of lever 25, the moment arm of the first pinch means was reduced to 0.43", while the second pinch means 49 had a moment arm of 3.07" about the pivot member, and 3.5" about the lever end portion 73.

Upon increasing the force applied to the lever end portion 73 to about 8.25 lbs. essentially no force was applied to the first pinch means 45, whereby the rubber metering tube 19 relaxed from its normally collapsed condition, while a force of about 17.4 lbs. acted upon the second pinch means which now had a moment arm of 3.17" as measured from the pivot member, and, of course, the constant 3.5" moment arm as measured from the lever end portion 73. Thus, the measured charge 77 of insecticide was free to flow, and did flow, from the pinch valve 47 and into the hollow wand 15 for discharge onto areas as determined by the operator.

I claim:

1. A pinch valve for use in dispensing measured amounts of flowable material including a support plate, an operating lever, a resilient tube between said support plate and said lever for conveying flowable material, first and second pinch means on said lever in longitudinally spaced relationship thereof, and means connecting said support plate and said lever for movement of said first and second pinch means relative to said support plate between a position in which said resilient tube is normally collapsed by said first pinch means and a position in which said resilient tube is permitted to relax from such normally collapsed condition only after said resilient tube is collapsed from a normally relaxed position by said second pinch means during movement of an end portion of said lever adjacent thereto toward said support plate, said connecting means including a pivot member on said lever between said first and second pinch means, and a resilient means extending between said support plate and said pivot member.

2. A pinch valve as defined in claim 1 wherein said first pinch means is spaced from said pivot member such distance that said first means normally maintains said resilient tube collapsed under the force applied through said first means by said resilient means.

3. A pinch valve as defined in claim 2 wherein said second pinch means is spaced from said lever end portion such distance that the force applied through said second pinch means by movement of said lever end portion exceeds the force applied through said first pinch means by said resilient means, whereby said resilient tube relaxes from its normally collapsed condition.

4. A pinch valve as defined in claim 1 wherein said first and second pinch means are spaced from said pivot member and said lever end portions, respectively, such distances that the force applied through said second pinch means during movement of said lever end portion is generally equal to and then exceeds the force applied through said first pinch means by said resilient means, whereby said resilient tube is collapsed by both said first and second means and subsequently permitted to relax from its normally collapsed condition.

5. A pinch valve as defined in claim 4 wherein said resilient means is a leaf spring having a free end engaged with said pivot member and its opposite end fixed to said support plate.

6. A pinch valve as defined in claim 5 wherein said connecting means further includes a drag link extending between and pivotally mounted on said support plate and said pivot member.

7. A pinch valve as defined in claim 6 wherein said operating lever includes a web and flanges, said flanges straddling said support plate and having mounted thereon said pivot member adjacent to one side of said support plate and said first and second pinch members adjacent to the opposite side of said support plate.

8. A pinch valve as defined in claim 7 wherein said second pinch means is adjustable longitudinally of said flanges to vary the spacing thereof relative to said first pinch means.

9. In an apparatus for dispensing flowable material having canister for containing flowable material, a hollow wand for directing discharge of flowable material from said apparatus, and a flexible conduit for delivering flowable material by gravity from said canister to said wand, the improvement comprising a pinch valve including a resilient tube and a support plate extending between and connected to adjacent ends of said conduit and said wand, an operating lever having first pinch means adjacent to said wand and second pinch means adjacent to said conduit which cooperate with said support plate to selectively collapse longitudinally spaced portions of said resilient tube therebetween, and means connecting one end of said lever for pivotal movement relative to said support plate between a position in which said resilient tube is normally collapsed by said first pinch means, whereby flowable material from said conduit is contained within said resilient tube, and a position in which said resilient tube is permitted to relax from such normally collapsed condition only after said resilient tube is collapsed by said second pinch means, whereby the charge of flowable material contained between portions of the resilient tube collapsed by said first and second pinch means is released into said wand for discharge from said apparatus, said connecting means including a pivot member, a drag link pivotally mounted on said pivot member and pivotally connected to said support plate at a location adjacent to said wand, and a spring positioned between said pivot member and said support plate.

10. In an apparatus as defined in claim 9 wherein said first pinch means is spaced from said pivot member such distance that said first means normally maintains said resilient tube collapsed under the force applied thereto by said spring.

11. In an apparatus as defined in claim 9 wherein said first and second pinch means are spaced from said pivot member and the end portion of said lever remote from said one end, respectively, distances such that the force applied through said second pinch means during movement of said lever is generally equal to and then exceeds the force applied through said first pinch means by said spring, whereby said resilient tube is collapsed by both said first and second pinch means and subsequently permitted to relax from its normally collapsed condition.

12. In an apparatus as defined in claim 9 wherein said spring is a curved leaf spring having a free end engaged with said pivot member and its opposite end fixed to said support plate adjacent to said conduit.

13. In an apparatus as defined in claim 12 wherein said operating lever includes a web and flanges, said flanges straddling said support plate and having mounted thereon said pivot member adjacent to one side of said support plate and said first and second pinch members adjacent to the opposite side of said support plate.

14. In an apparatus as defined in claim 13 wherein said second pinch means is adjustable longitudinally of said flanges to vary the spacing thereof relative to said first pinch means.

* * * * *